(12) United States Patent
Osann, Jr.

(10) Patent No.: US 8,429,160 B2
(45) Date of Patent: Apr. 23, 2013

(54) USER PREFERENCE CORRELATION FOR WEB-BASED SELECTION

(76) Inventor: Robert Osann, Jr., Port Angeles, WA (US)

( * ) Notice: Subject to any disclaimer, the term of this patent is extended or adjusted under 35 U.S.C. 154(b) by 149 days.

(21) Appl. No.: 12/903,062

(22) Filed: Oct. 12, 2010

(65) Prior Publication Data

US 2012/0089590 A1  Apr. 12, 2012

(51) Int. Cl.
*G06F 17/30* (2006.01)
(52) U.S. Cl.
USPC ........ 707/732; 707/694; 707/709; 705/14.44; 705/14.53; 705/14.66
(58) Field of Classification Search .................. 707/694, 707/709, 732; 705/14.44, 14.53, 14.66
See application file for complete search history.

(56) References Cited

U.S. PATENT DOCUMENTS

| | | | |
|---|---|---|---|
| 7,266,546 B2 | 9/2007 | Son | 707/3 |
| 2005/0021729 A1 | 1/2005 | Yoshida | 709/223 |
| 2006/0173974 A1 | 8/2006 | Tang | 709/217 |
| 2006/0282304 A1* | 12/2006 | Bedard et al. | 705/10 |
| 2007/0204004 A1 | 8/2007 | Coyer et al. | 709/217 |
| 2010/0023399 A1* | 1/2010 | Sahni et al. | 705/14.53 |
| 2010/0023506 A1* | 1/2010 | Sahni et al. | 707/5 |
| 2010/0153411 A1* | 6/2010 | Toebes et al. | 707/758 |
| 2011/0270703 A1* | 11/2011 | Engle | 705/26.7 |

* cited by examiner

*Primary Examiner* — Khanh Pham

(57) ABSTRACT

A database of user preference information is extracted and compiled from multiple websites by web-crawling robots without cooperation or specific participation by users. Users who interact with a website are frequently required to register and create a login or userID name that uniquely identifies them. Thereafter, when an individual rates an item, it is often recorded and published under their userID name such that other users can see how a specific individual rated the item. Although there is no requirement that a specific user register on different websites utilizing the identical userID, it is extremely common that this practice occurs and the use of identical userIDs on multiple sites is used herein to expand preference analysis beyond a single site. Once the database exists, users can request or be passively offered suggestions that result from preference associations across multiple websites as performed by a preference analysis and suggestion function.

11 Claims, 5 Drawing Sheets

USER PREFERENCE CORRELATION FOR WEB-BASED SELECTION

COPYRIGHT NOTICE

Figure 1:
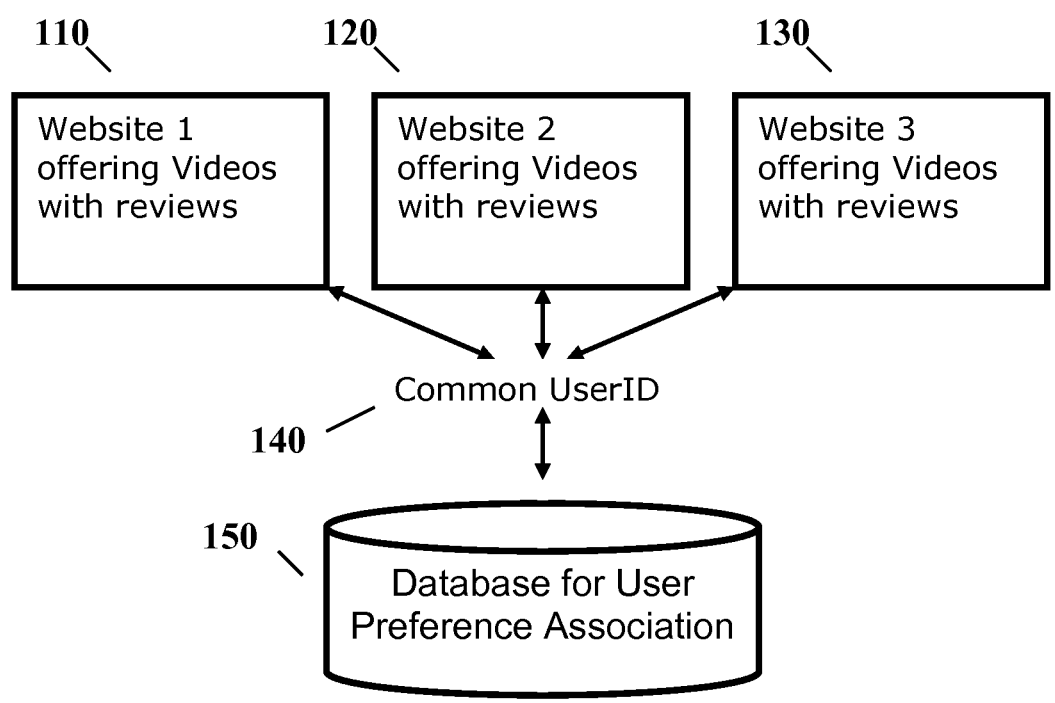

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the selection of items from a set of items or services (in general, hereinafter referred to collectively as "items") offered or referenced on the Web or Internet in light of user preferences, including sharing and social networking online functionalities, and in particular methods for determining and utilizing user preferences that are not explicitly shared. Items may include media such as videos and photos, but may also include tangible goods such as books, garments, household items, or even services such as restaurants, moving companies, dentists, plumbers, or retail stores, to name a few.

BACKGROUND OF THE INVENTION

Learning what's available on the web that matches one's preferences is generally considered to be useful. Sharing favorites or preferences with people is useful. Since what constitutes a favorite is very personal, recommendations from someone whose favorites more closely match your favorites is especially useful. Many times a friend tells you about some great movie, you often find you don't like it. Just because they are a friend, doesn't mean they like the same things you do. However, there are people out there who do have preferences very similar to yours. You just don't know who they are.

A single website that keeps track of user preferences (like amazon.com or youtube.com) has a database on which to draw in order to offer the capability for "people who liked this also liked . . . " or the even more focused, "people who in general like what you like, also like . . . ". Amazon chooses to offer such a functionality while at the time of this writing, Youtube does not. Regardless, when a particular website offers this preference matching functionality, it ONLY does it within that website. Some websites like yelp.com do not offer items for sale or download, but focus specifically on reviews for products and/or services. At present, user/visitor preferences for websites are useful in determining preference associations among users, however again, the ability to match preferences and suggest other items that the visitor might like is only available for items on that particular website and does not span multiple websites.

Determining suggestions based on an analysis of user preferences is based on a process generally known in the art as Collaborative Filtering (CF). According to Wikipedia.com, "this is the process of filtering for information or patterns using techniques involving collaboration among multiple agents, viewpoints, data sources, etc. Applications of collaborative filtering typically involve very large data sets. Collaborative filtering methods have been applied to many different kinds of data including sensing and monitoring data—such as in mineral exploration, environmental sensing over large areas or multiple sensors; financial data—such as financial service institutions that integrate many financial sources; or in electronic commerce and web 2.0 applications where the focus is on user data, etc." "The method of making automatic predictions (filtering) about the interests of a user by collecting taste information from many users (collaborating). The underlying assumption of CF approach is that those who agreed in the past tend to agree again in the future. For example, a collaborative filtering or recommendation system for television tastes could make predictions about which television show a user should like given a partial list of that user's tastes (likes or dislikes). Note that these predictions are specific to the user, but use information gleaned from many users."

Today, the ability to match preferences and suggest other items that the visitor might like does not span multiple websites. Thus, it would be novel and advantageous to offer a preference matching and suggestion capability that spans the breadth of the Internet—covering all sites offering a specific type of item (videos, books, services, restaurants, etc.) or alternately covering multiple item categories. With such a capability, users would benefit from a higher degree of correlation and thus would make more informed decisions on products and services they buy.

SUMMARY OF THE INVENTION

In order to build a site where people voluntarily participate in and contribute to a "universal preferences database" based on preference information that is explicitly supplied by each user, there is a substantial obstacle of how a critical mass of information is initially compiled. Essentially this is a "chicken-or-the-egg" problem regarding how to jump-start the entire methodology so that enough people participate to make it work. The major barrier to jump-starting is getting people to sign up. Why should someone take the time to sign up and enter their favorites/preferences when there is not enough information assembled to provide them any useful information in return? The solution lies in using their unique "login" or "userID" name to acquire preference information and build a database of user preference information without requiring participation by users. Once this information has been gathered by web robots, users can request (or be passively offered) suggestions that result from preference associations across multiple websites as performed by a preference analysis and suggestion software functionality that may for some embodiments be implemented as a software program working in conjunction with associated databases.

DETAILED DESCRIPTION OF THE INVENTION

A database of user preference information is extracted and compiled from multiple websites by web crawling robots according to the invention without cooperation from users, or specific participation by any user. Website users who interact with a website are frequently required to register with that site and create a login or userID name that uniquely identifies them. Thereafter, when an individual rates an item, it is often recorded and published under their userID name such that other users can see how a specific individual rated the item. Although there is no requirement that a specific user register on different websites utilizing the identical userID, it is extremely common that this practice occurs. Once the database exists, users can request or be passively offered suggestions that result from preference associations across multiple websites as performed by a preference analysis and suggestion function. The passive offering of suggestions may include without limitation making a phrase or image into a hyperlink; or alternately showing a pop-up image, text box, or dialog box that offers suggestions when the user's cursor passes over the item in question.

The instant invention takes advantage of the frequent use of a unique userID by a particular user. Also, the more unique the userID, the more likely that the userID belongs to the same person when that userID is found registered on multiple websites. A userID such as "john21" may have multiple users, however a more complicated and unusual userID such as "quattro711" or "robogal321" is most probably unique.

Specific userIDs that are utilized by more than one individual may be separated according to preference commonalities and lack thereof. For instance if the preferences on a first set of websites for a specific first userID match consistently with a first group of other users registered on the first set of websites and having similar preferences, and then on a particular second set of websites the preferences published for the same first userID are quite different from those of those same first group of other users who are coincidentally registered on the second set of websites, then it can be statistically assumed that the actual user who registered on the second set of websites using the first userID is a different person from the user who registered the first userID on the first set of websites. Once this identification has been performed, the preference associations can be separated to still extract value from preferences associated with the first userID in spite of its use by multiple persons.

One example of the process for creating the overall database and preference analysis functionality according to the instant invention is described as the following multi-stage process:

Stage 1

Build a database of online media and user preferences, so that if someone really likes a particular video, a software program can find in the database others that really liked it, and then learn what else they like. This database is built by web robots that "crawl" multiple websites where user preferences are published and are associated with specific userIDs, all without any user participation required. Crawling is well know in the art and involves the process where software programs called robots access pages on websites looking for information, and then download and save information in a database when the information fits a criteria that suits the purpose of the particular robot.

Stage 2

A software widget—a software program that for some embodiments of the instant invention may be installed as a plugin for a browser on the user's computer—is made available for one exemplary embodiment of the instant invention so that when someone using a browser selects or "right clicks" on a particular item, they are presented with a menu wherefrom they can choose a function such as "people who liked this also liked . . . ". Again, the user has not supplied their userIDs or passwords. They may or may not have registered to get the required program or widget, and if they registered, the registration function may or may not have acquired their email address. The widget, plugin, or other program that allows a user to access preference-related suggestions according to the instant invention may also have been supplied as part of another program, plugin, or widget they may have installed. Alternately, it may have come pre-installed on their computer or may be implemented by a dynamically loaded function such as for example one running in Java code that becomes active as a result of a user browsing a particular webpage. The screen where the user is presented with a message such as "people who liked this also liked . . . " can have advertising on it, and that advertising is a possible way of monetizing the functionality of the instant invention. Another method for monetizing the instant invention would include a "pay-per-click-through" relationship with websites offering items suggested to the user by the preference analysis and suggestion functionality according to the instant invention. Functionality can be added to the instant invention to enable a user to sign up and provide access to their favorites on different content sites, however this is not required for the successful operation of the instant invention. Also, a website that helps users locate products on the Internet similar to www.nextag.com or www.bizrate.com can incorporate a function that includes "people who liked this also liked . . . ", and show items to users that are available on a plurality of websites utilizing the methods described herein for the instant invention.

To construct the database for Stage 1, the system of the instant invention can, for instance, start by having web robots access a website such as YouTube.com. YouTube shows "related videos" and "more videos from the same source" and "promoted videos", but doesn't show the user a function such as "people who liked this also liked . . . ". "Related videos" are simply topic-related on YouTube.com.

On YouTube, comments and responses for each video show the user IDs and are categorized by Excellent, Very Good, Good, Average, and Poor. So, the software and system implementing the instant invention will implement a web robot or a plurality of robots that access all YouTube pages containing video reviews and analyze the user comments. For instance, if the system is set to acquire the most positive preferences such as the ones marked "Excellent", then the robot would retrieve only the comments indicating a user rated a video as "Excellent". Subsequently, the robot records the userIDs of each person who is listed along with the link for the video. The software system implementing the instant invention can be programmed to record user preferences that are of any or all degrees of a positive or negative nature.

When the process described above has been completed for all videos offered on a media site such as YouTube, there now exists a database on which a software program can perform the associative analysis needed to create the function of "people who liked this video also liked . . . ". Since people often use the same userID across many content sites, another robot can then scour other sites and see what they liked elsewhere. To weed out instances where two people used the same ID, a comparison of topics for the associated videos can be performed. Where the preferences associated with a particular user ID on a particular site are very inconsistent with what that user has chosen on other sites, as determined by preference similarities shared with other users, it may be considered that a different user is using the same userID.

FIG. 1 shows a diagram where websites 110, 120, and 130 are offering videos including reviews of these videos where the reviews are annotated with a userID for each review. A web robot or robots according to this invention crawl these websites and records preference information and corresponding userIDs in database 150. Preference association software according to the instant invention associates reviews across the multiple websites shown according to userIDs while paying particular attention to instances where a common userID or login name 140 has been utilized on different websites. The initial assumption here is that a specific userID used on multiple websites most probably represents the same person or user.

Figure 2:
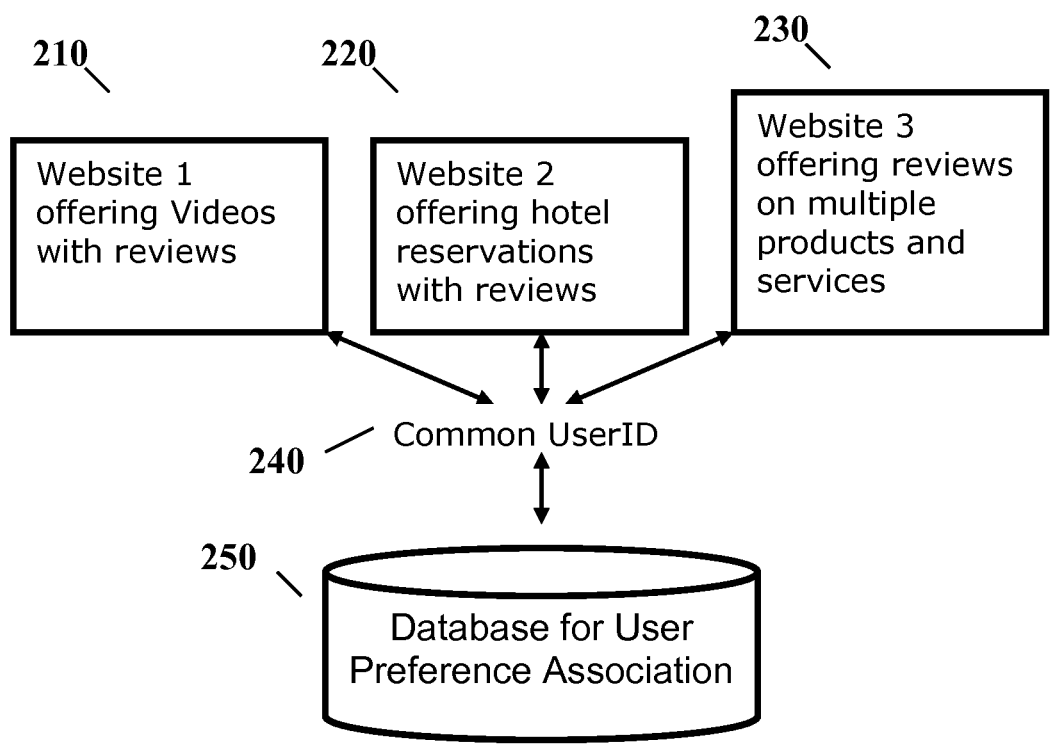

The diagram of FIG. 2 shows how a common userID 240 can be recognized on a plurality of websites offering unrelated items. For instance, website 210 offers videos while website 220 offers hotel reservations. Website 230 may be a website offering multiple products and services depending upon what a user searches for within website 230. Again, information extracted by one or more web robots is used to compile database 250 which is used for user preference association and analysis software. For instance, as a result of the architecture and functionality shown in FIG. 2, a user might request that they be shown hotels in a particular city that were preferred by people who liked the kinds of videos they like.

Figure 3:
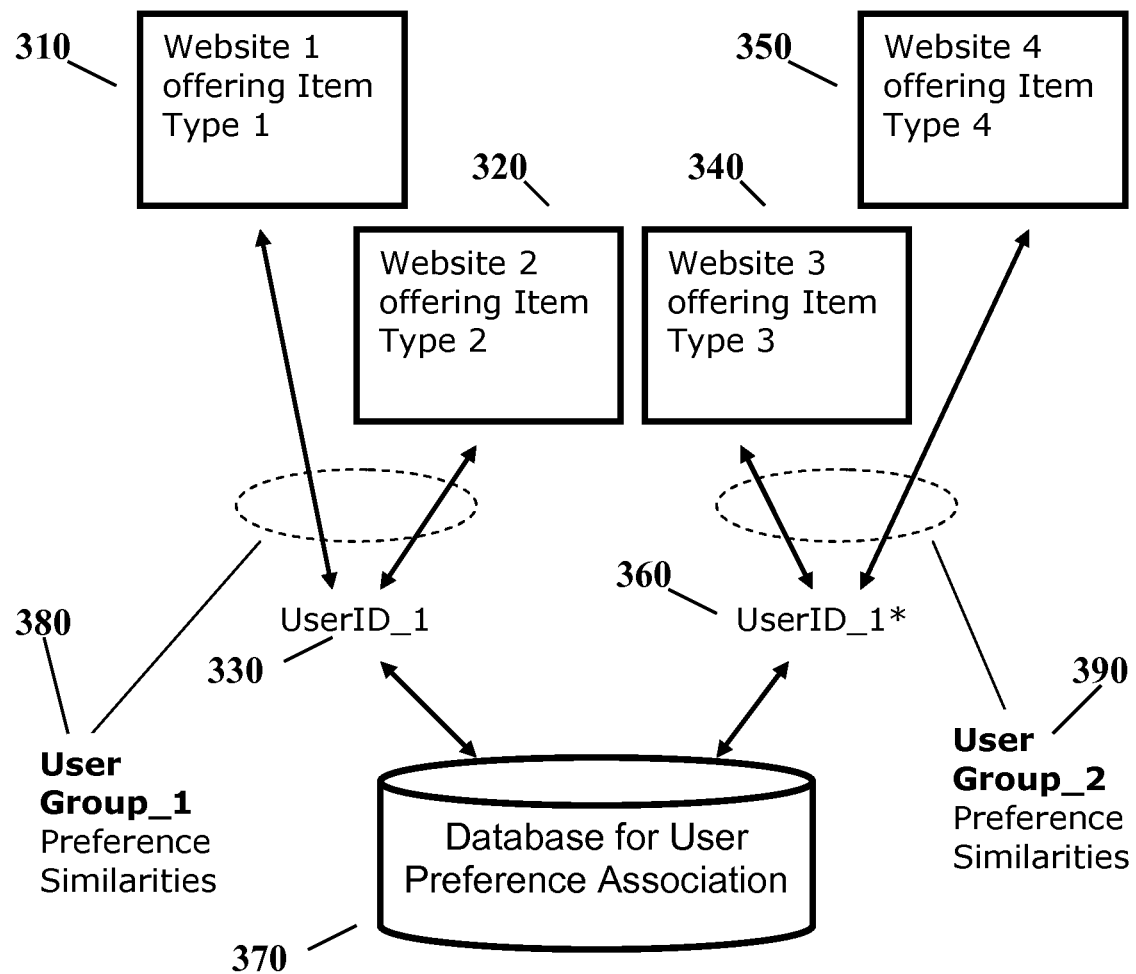

Although it is extremely common for a user to use an identical login name on many different websites, and for a login name to be unique to a particular user, as mentioned earlier a particular login name may be utilized by multiple users. For instance, a userID such as "john21" may have multiple users, however a more complicated and unusual userID such as "quattro711" or "robogal321" is most probably unique. Therefore, the present invention provides a mechanism for determining when a particular login or userID is not unique, and subsequently treats the userID as multiple userIDs according to preference associations. FIG. 3 shows how information is analyzed and organized in order to implement this capability. Websites 310 and 320 offers reviews for items by a user having userID_1 330. A first user using userID_1 on websites 310 and 320 has preference similarities to a group of other users that may be called User Group_1 380. The same userID, labeled userID_1* 360 in FIG. 3, is also utilized by a different person than the person using that userID_1 on websites 310 and 320. This second user has used userID_1* on websites 340 and 350 and has preference similarities that match with a different group of users, here labeled User Group_2 390. Preference analysis and Association software operating on database 370 determines that the preferences for users in User Group_1 are different from those of users in User Group_2. As a result of this analysis, software according to the instant invention determines that the first user of user ID_1 is a different person than the second user of userID_1 and henceforth treat them as different users with respect to the websites 310, 320, 330, and 340.

Figure 4:
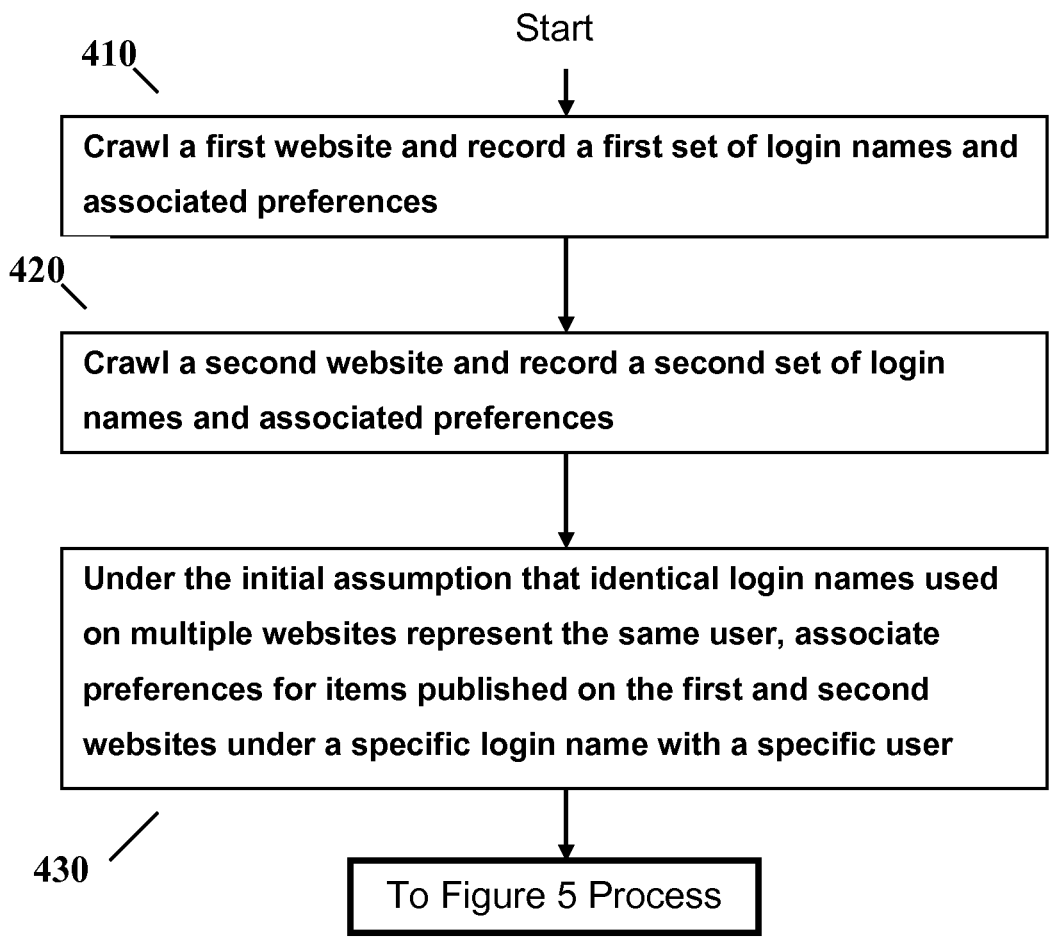

FIG. 4 shows a process for building a preference database across multiple websites under the initial assumption that identical login names used on multiple websites represent the same user. In step 410, a web robot crawls a first website and records a first set of login names and associated preferences for items shown on the first website. In step 420, a web robot crawls a second website and records a second set of login names and associated preferences. In step 430, a software function according to the instant invention performs preference analysis including examining preference data and login names that were extracted from the first and second website, and associating items for which reviews were published under a specific login name with that same login name across multiple websites. The process may be repeated with additional websites to build a preference database encompassing a wide range of websites and item types.

Figure 5:
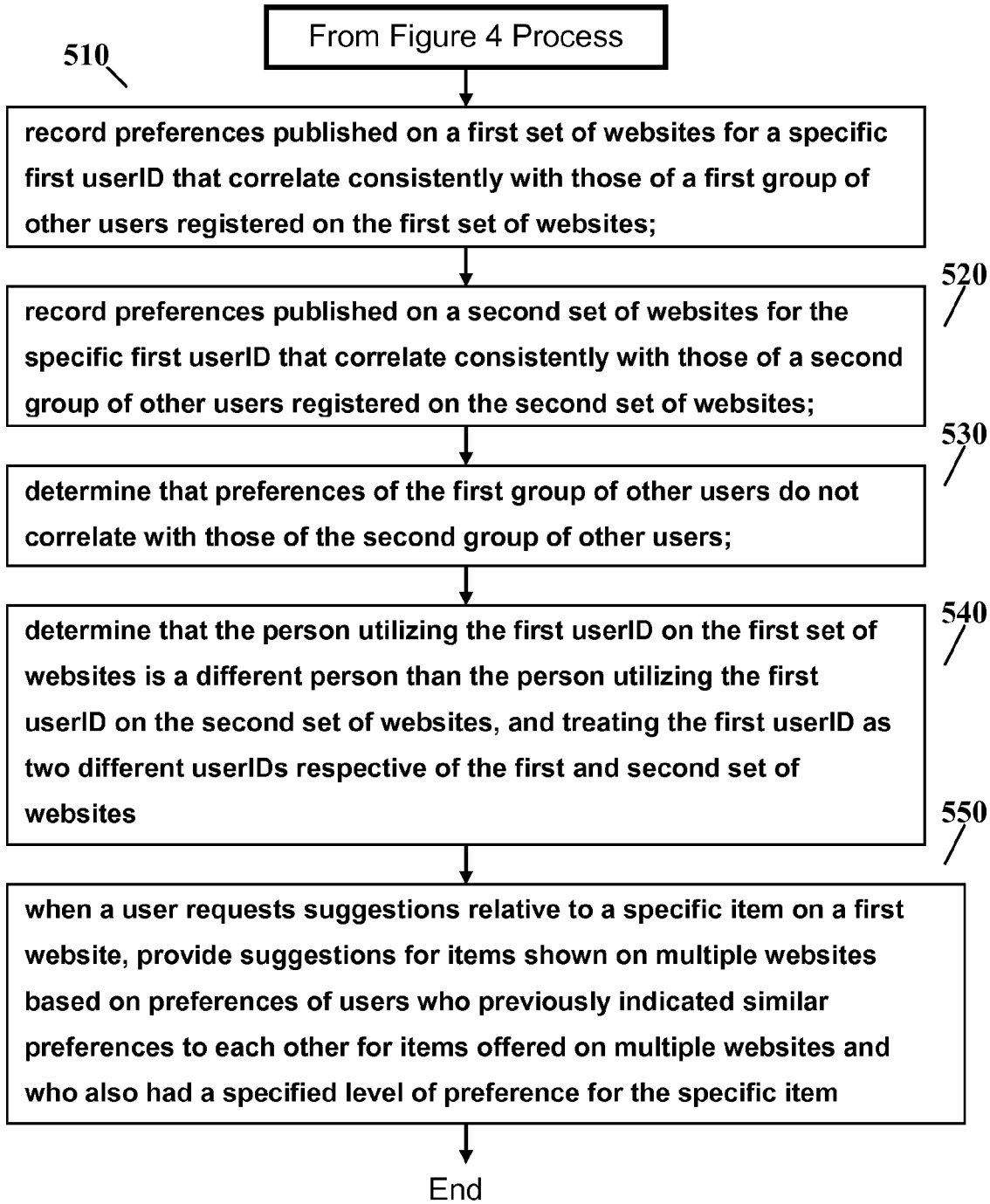

The process shown in FIG. 5 optionally continues where the process of FIG. 4 left off, and resolves the issue of a specific user ID or login name being used by multiple users. In step 510 preferences on a first set of websites for the userID are recorded as correlating with preferences of a first group of other users who have also published reviews on the first set of websites. In step 520 preferences are recorded for a second set of websites where the same specific userID has been used, preferences on the second set of websites correlating with a second group of users who have published reviews on the second set of websites. In step 530, analysis software determines that the preferences of the first group of users do not correlate with those of the second group of users, and therefore in step 540 the system according to the instant invention has determined that the person utilizing the userID on the first set of websites is a different person than the person using the same userID on the second set of websites. According to this process and per step 550, when a user thereafter requests suggestions relative to a specific item on a website, the system provides suggestions for items shown on multiple websites based on users who previously indicated similar preferences to each other and also had a specified level of preference for the specific item. According to the process of FIG. 5, two or more users who utilized the same userID on different websites will be properly treated as different persons.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system for assisting users with the selection of items on the Internet, comprising:
   one or more hardware processors;
   at least one web robot operable on the one or more hardware processors for crawling multiple websites to determine published userIDs and associated published preferences;
   a database accessible to the one or more hardware processors for storing the userIDs and associated preferences;
   software operable on the one or more hardware processors for performing an analysis and suggestion function;
   wherein the system initially assumes that a userID used by a first user on a first website represents the same user as the same userID used by a second user on a second website;
   wherein associated preferences stored for a particular userID include preferences for items available from a plurality of websites;
   wherein the system provides a particular third user with specific preference association information for a first item based on the expressed preferences of at least the first and second users across multiple websites relative to the first item and items that at least the first and second the other users have previously reviewed; and
   wherein to provide the preference association information to the third user, the third user need not be identified and need only indicate an interest in the first item; and
   wherein the operation of the system includes the steps of:
   recording preferences published on a first set of one or more websites for a specific first userID that correlate consistently with those of a first group of other users registered on the first set of one or more websites;
   recording preferences published on a second set of one or more websites for the specific first userID that correlate consistently with those of a second group of other users registered on the second set of one or more websites;

determining that preferences of the first group of other users published on the first set of one or more websites do not correlate with those of the second group of other users published on the second set of one or more websites; and determining due to a lack of preference correlation between the first group of other users and the second group of other users that the person utilizing the first userID on the first set of one or more websites is a different person than the person utilizing the first userID on the second set of one or more websites and thereafter treating the first userID as two different userIDs respective of the first and second sets of websites.

2. The system of claim 1, wherein when the third user requests suggestions relative to a specific product or service category, providing suggestions for items shown on multiple websites based on preferences of users who had similar preferences to each other for items offered on multiple websites and who also had a specified level of preference for said specific product or service category; and wherein the third user need provide no preference information beyond requesting suggestions relative to the specific product or service category in order to receive the suggestions.

3. The system of claim 2 further including a widget or plugin operating on a user's computer that responds to a selection action of a user respective of a particular item and whereby the selection action causes the user to receive said suggestions for items shown on multiple websites.

4. The system of claim 1, wherein the specific preference association information supplied to the third user includes at least one suggested item.

5. A Method for enabling users to receive suggestions relative to items shown on one or more websites based on preference associations across multiple websites, comprising:

crawling a first website and recording in a database a first set of published login names and associated published preferences for said first set of login names;

crawling a second website and recording in said database a second set of published login names and associated published preferences for said second set of login names; and under the initial assumption that identical login names used on multiple websites represent the same user, associating preferences for items published on multiple websites under a specific login name with a specific user; and wherein to determine that a first instance of a specific UserID used to express preferences on a first website represents a different user than a second instance of the specific UserID used to express preferences on a second website, the method further comprises:

recording preferences published on a first set of one or more websites for a specific first userID that correlate consistently with those of a first group of other users registered on the first set of one or more websites;

recording preferences published on a second set of one or more websites for the specific first userID that correlate consistently with those of a second group of other users registered on the second set of one or more websites;

determining that preferences of the first group of other users published on the first set of one or more websites do not correlate with those of the second group of other users published on the second set of one or more websites; and determining due to a lack of preference correlation between the first group of other users and the second group of other users that the person utilizing the first userID on the first set of one or more websites is a different person than the person utilizing the first userID on the second set of one or more websites and thereafter treating the first userID as two different userIDs respective of the first and second sets of websites.

6. The method of claim 5, further comprising:

when any user requests suggestions relative to a specific product or service category, providing suggestions for items shown on multiple websites based on preferences of users who previously indicated similar preferences to each other for items offered on multiple websites and who also had a specified level of preference for said specific product or service category; and wherein said user need provide no preference information beyond requesting suggestions relative to the specific product or service category in order to receive the suggestions.

7. The method of claim 5, further comprising:

when any user requests suggestions relative to a specific item on a first website, providing suggestions for items shown on multiple websites based on preferences of other users who previously indicated similar preferences to each other for items offered on multiple websites and who also had a specified level of preference for said specific item; and wherein said user need provide no preference information beyond requesting suggestions relative to the specific item in order to receive the suggestions.

8. The method of claim 5, further comprising:

when any user requests suggestions for a specific product or service category from a first website, providing suggestions for items available on said first website based on preferences of users who had similar preferences to the first user for items offered on at least a second website; and wherein said user need provide no preference information beyond requesting suggestions relative to the specific product or service category in order to receive the suggestions.

9. The method of claim 8 wherein preferences for the first group of other users are similar to each other and preferences for the second group of other user are similar to each other.

10. A method for enabling users to receive suggestions relative to items shown on one or more websites based on preference association across multiple websites, comprising:

when a first user visits a first website, showing the first user a first item available on at least a second website, based on published reviews available on at least a third and fourth website;

wherein the first item previously received positive reviews from a second user on the third website and a third user on the fourth website;

wherein the first item previously received positive reviews from a fourth user published on both the third and fourth websites under the same userID;

wherein the reviews from the second, third, and fourth users were retrieved by a Web crawler based on each user's published userID;

wherein published reviews from the second, third, and fourth users correlate with each other; and wherein the method further comprises the steps of:

recording preferences published on a first set of one or more websites for a specific first userID that correlate consistently with those of a first group of other users registered on the first set of one or more websites;

recording preferences published on a second set of one or more websites for the specific first userID that correlate consistently with those of a second group of other users registered on the second set of one or more websites;

determining that preferences of the first group of other users published on the first set of one or more websites do not correlate with those of the second group of other users published on the second set of one or more websites; and determining due to a lack of preference correlation between the first group of other users and the second group of other users that the person utilizing the first userID on the first set of one or more websites is a different person than the person utilizing the first userID on the second set of one or more websites and thereafter treating the first userID as two different userIDs respective of the first and second sets of websites.

11. The method of claim 10 wherein to be shown the first item available on the second website, the first user need not be identified by the first website and need only show an interest in a product or service, or in a product or service category.

* * * * *